United States Patent
André-Jönsson et al.

(10) Patent No.: US 9,578,577 B2
(45) Date of Patent: Feb. 21, 2017

(54) METHODS AND APPARATUSES IN COMMUNICATION SYSTEMS

(75) Inventors: Henrik André-Jönsson, Linköping (SE); Rasmus Axén, Linköping (SE); Lena Melin, Vaxholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 68 days.

(21) Appl. No.: 14/003,966

(22) PCT Filed: May 2, 2011

(86) PCT No.: PCT/SE2011/050550
§ 371 (c)(1),
(2), (4) Date: Sep. 9, 2013

(87) PCT Pub. No.: WO2012/125094
PCT Pub. Date: Sep. 20, 2012

(65) Prior Publication Data
US 2013/0343347 A1  Dec. 26, 2013

Related U.S. Application Data

(60) Provisional application No. 61/451,757, filed on Mar. 11, 2011.

(51) Int. Cl.
*H04W 4/00* (2009.01)
*H04W 36/30* (2009.01)
(Continued)

(52) U.S. Cl.
CPC ............ *H04W 36/30* (2013.01); *H04W 36/14* (2013.01); *H04W 36/0022* (2013.01); *H04W 88/10* (2013.01)

(58) Field of Classification Search
CPC .. H04W 36/0022; H04W 36/14; H04W 36/30; H04W 88/10
(Continued)

(56) References Cited

U.S. PATENT DOCUMENTS 7,643,414 B1 * 1/2010 Minhazuddin ................ 370/230
7,719,985 B2 * 5/2010 Lee ........................ H04L 12/185
370/230

(Continued)

OTHER PUBLICATIONS

International Search Report, PCT/SE2011/050550, Jan. 6, 2012.
(Continued)

*Primary Examiner* — Khaled Kassim
*Assistant Examiner* — Berhanu Belete
(74) *Attorney, Agent, or Firm* — Myers Bigel, P.A.

(57) ABSTRACT

A method in a legacy access node for selecting a suitable RAN, of a plurality of RANs for a LTE UE, capable of both PS and CS sessions in a global communication network. The method comprises connecting the UE to a legacy RAN via a radio interface module and then establishing a PS session with the connected UE. The bandwidth that the UE currently is consuming is monitored and compared with a predefined bandwidth threshold. If the consumed bandwidth exceeds the predefined bandwidth threshold an attempt will be made to trigger transferring of the UE from the current legacy RAN to the LTE RAN. A corresponding method is disclosed in a eNodeB where the attempt to trigger transferring of the UE from the LTE RAN to the legacy RAN is made if the consumed bandwidth falls below the predefined threshold. Related legacy access nodes and eNodeBs perform the methods.

16 Claims, 4 Drawing Sheets

(51) Int. Cl.
*H04W 36/14* (2009.01)
*H04W 36/00* (2009.01)
*H04W 88/10* (2009.01)

(58) Field of Classification Search
USPC .......................................................... 370/332
See application file for complete search history.

(56) References Cited

U.S. PATENT DOCUMENTS

| | | | | |
|---|---|---|---|---|
| 8,217,945 | B1* | 7/2012 | Moscovici | G06Q 10/101 345/440 |
| 8,295,187 | B1* | 10/2012 | Toole | H04L 41/14 370/234 |
| 8,606,276 | B2* | 12/2013 | Bornier | H04W 36/14 370/331 |
| 8,634,381 | B2* | 1/2014 | Mahdi | H04W 36/0022 370/331 |
| 8,855,104 | B2* | 10/2014 | Hao | H04W 36/0022 370/328 |
| 8,929,284 | B2* | 1/2015 | Song et al. | 370/328 |
| 8,964,691 | B2* | 2/2015 | Chen | H04W 36/0022 370/331 |
| 2003/0002524 | A1* | 1/2003 | Feldman | H04L 12/5692 370/465 |
| 2006/0294244 | A1* | 12/2006 | Naqvi | H04M 7/123 709/227 |
| 2008/0214190 | A1* | 9/2008 | Aalto | H04W 92/02 455/435.1 |
| 2009/0073936 | A1* | 3/2009 | Jentz | H04W 36/0022 370/331 |
| 2009/0080382 | A1* | 3/2009 | Chen | H04W 36/0016 370/331 |
| 2009/0088159 | A1* | 4/2009 | Wu et al. | 455/436 |
| 2009/0286544 | A1* | 11/2009 | Huber | G06Q 20/1235 455/450 |
| 2010/0040020 | A1* | 2/2010 | Chen | H04W 36/0022 370/331 |
| 2010/0080186 | A1* | 4/2010 | Guo et al. | 370/329 |
| 2010/0095021 | A1* | 4/2010 | Samuels | H04L 12/5695 709/235 |
| 2010/0172323 | A1* | 7/2010 | Rexhepi | H04W 36/0016 370/331 |
| 2010/0195644 | A1* | 8/2010 | Hao | H04W 36/0022 370/352 |
| 2010/0273485 | A1* | 10/2010 | Huang et al. | 455/435.3 |
| 2010/0278142 | A1* | 11/2010 | Dwyer | H04W 36/0083 370/331 |
| 2010/0279677 | A1* | 11/2010 | Dwyer | H04W 48/16 455/422.1 |
| 2011/0014912 | A1 | 1/2011 | Ahluwalia et al. | |
| 2011/0059736 | A1* | 3/2011 | Norrman | H04W 12/12 455/424 |
| 2011/0103305 | A1* | 5/2011 | Ali | H04W 76/062 370/328 |
| 2011/0110326 | A1* | 5/2011 | Rexhepi | H04W 36/0022 370/331 |
| 2011/0188451 | A1* | 8/2011 | Song | H04W 36/0033 370/328 |
| 2011/0211525 | A1* | 9/2011 | Mahdi | 370/328 |
| 2011/0261747 | A1* | 10/2011 | Wang et al. | 370/315 |
| 2012/0170503 | A1* | 7/2012 | Kelley | H04W 48/06 370/312 |
| 2013/0010656 | A1* | 1/2013 | Chin | H04W 48/18 370/280 |

OTHER PUBLICATIONS

Written Opinion of the International Searching Authority, PCT/SE2011/050550, Jan. 6, 2012.
International Preliminary Report on Patentability, PCT/SE2011/050550, Feb. 28, 2013.
3GPP TSG-RAN WG2 Meeting #59bis; "Service and subscriber based inter-RAT mobility scenarios" R2-074468; Shanghai, China, Oct. 8-12, 2007. , Route des Lucioles; F-06921 Sophia-Antipolis Cedex; France. XP050137013.

* cited by examiner

METHODS AND APPARATUSES IN COMMUNICATION SYSTEMS

CROSS REFERENCE TO RELATED APPLICATION

This application is a 35 U.S.C. §371 national stage application of PCT International Application No. PCT/SE2011/050550, filed on 2 May 2011, which itself claims the benefit of U.S. provisional Patent Application No. 61/451,757, filed 11 Mar. 2011, the disclosures and contents of both of which are incorporated by reference herein in their entirety. The above-referenced PCT International Application was published in the English language as International Publication No. WO 2012/125094 A1 on 20 Sep. 2012.

TECHNICAL FIELD

The present invention relates to methods and apparatuses for selecting a suitable Radio Access Network (RAN) of a plurality of RANs for a Long Term Evolution (LTE) User Equipment (UE), capable of both Packet Switched (PS) and Circuit Switched (CS) sessions in a global communication network. In particular the present invention is directed towards when to trigger an attempt to transfer the UE connected to a legacy RAN to a LTE RAN or the other way around, i.e. when the UE is connected to the LTE RAN and should attempt to trigger transfer to the legacy RAN.

BACKGROUND

As is known voice services in mobile networks have strict regulations to allow emergency calls to operate correctly. When it comes to legacy Radio Access Technologies (RATs) such as Global System for Mobile communications (GSM), Code Division Multiple Access 2000 (CDMA2000) and Wideband CDMA (WCDMA) they have been developed over quite some time to fulfill these regulations. However, when it comes to LTE that is now being rollout as a high bandwidth data service network the situation is different. The legacy RATs have native voice support whereas LTE can add voice support, including emergency services, using Voice over Internet Protocol (VoIP) anchored in IP Multimedia Subsystem (IMS). If IMS is not supported, whenever an evolved NodeB (eNodeB) detects that a voice call is being set up, the UE will be ordered to perform a transfer to a voice capable RAT, i.e. 2G or 3G legacy networks are used as fallback in order to get access to CS voice capable radio resources.

The added signaling in the LTE network and the resulting transfer to the CS capable RAN will add time to the CS call setup time. Further, if a problem occurs in the process of signaling and transferring preceding the CS fallback, there is usually not enough time to perform a retry or switch of strategy. It is well known that a delay is perceived as particularly disturbing in relation to voice sessions in general. CS fallback might also cause call setup delay in the magnitude of seconds, or worst case, call setup failure. From a user's perspective, this will be perceived as poor quality of service.

One way to reduce or eliminate this call set up time is to let the LTE capable UE camp on one of the legacy RANs and thereby avoid the extra signaling and transferring of it to the CS capable RAN. However, camping on one of the legacy RANs will make it necessary to transfer the UE to the LTE RAN whenever the user needs to take advantage of the high bandwidth data service provided by LTE.

Thus, there is a need to be able to decide how and when to make such a transfer from the legacy RAN to the LTE RAN and also to be able to decide when to make a transfer back from the LTE RAN to the legacy RAN.

SUMMARY OF THE INVENTION

It is an objective of the present invention to offer a solution to the problem when to transfer the UE from the legacy RAN to the LTE RAN and also from the LTE RAN to the legacy RAN. A basic principle of the present invention is anticipating the need for CS voice services such that any LTE and voice capable UE only connects to the LTE RAN if there is no ongoing CS session and when there is not provided sufficient PS data bandwidth via an available CS voice capable legacy RAN.

According to a first aspect of the present invention a method is achieved in a legacy access node for selecting a suitable RAN, of a plurality of RANs for a LTE UE, capable of both PS and CS sessions in a global communication network. The method comprises the steps of connecting the UE, via a radio interface module, to a legacy RAN capable of providing both CS and PS services and then establishing a PS session with the connected UE. The bandwidth that the UE currently is consuming is monitored and compared with a predefined bandwidth threshold. If the consumed bandwidth exceeds the predefined bandwidth threshold an attempt will be made to trigger transferring of the UE from the current legacy RAN to the LTE RAN.

In a preferred embodiment of the present invention the attempt to trigger the transfer is performed only if the UE is within the coverage area of the LTE RAN, the consumed bandwidth exceeds the predefined bandwidth threshold during a predefined time period and/or there is no ongoing CS connection.

In another preferred embodiment according to the first aspect of the present invention the connecting step further comprises providing the UE with a priority list directing it to preemptive camping on the legacy access network.

According to a second aspect of the present invention a method is achieved in an eNodeB for selecting a suitable RAN, of a plurality of RANs for a LTE UE, capable of both PS and CS sessions in a global communication network. The method comprises the steps of connecting the UE to a LTE RAN via a radio interface module and then establishing a PS session with the connected UE. The bandwidth that the UE currently is consuming is monitored and compared with a predefined bandwidth threshold. If the consumed bandwidth falls below the predefined bandwidth threshold an attempt will be made to trigger transferring of the UE from the LTE RAN to the legacy RAN.

In a preferred embodiment of the present invention according to the second aspect the attempt to trigger the transfer is made only if the consumed bandwidth exceeds the predefined bandwidth threshold during a predefined time period.

According to a third and fourth aspect of the present invention there is also achieved a legacy access node and an eNodeB that are adapted and configured to perform the methods according to the first and the second aspect of the present invention, respectively.

BRIEF DESCRIPTION OF DRAWINGS

These and other aspects, features and advantages of which the invention is capable of will be apparent and elucidated from the following description of embodiments of the present invention, reference being made to the accompanying drawings, in which.

DETAILED DESCRIPTION

Figure 1:
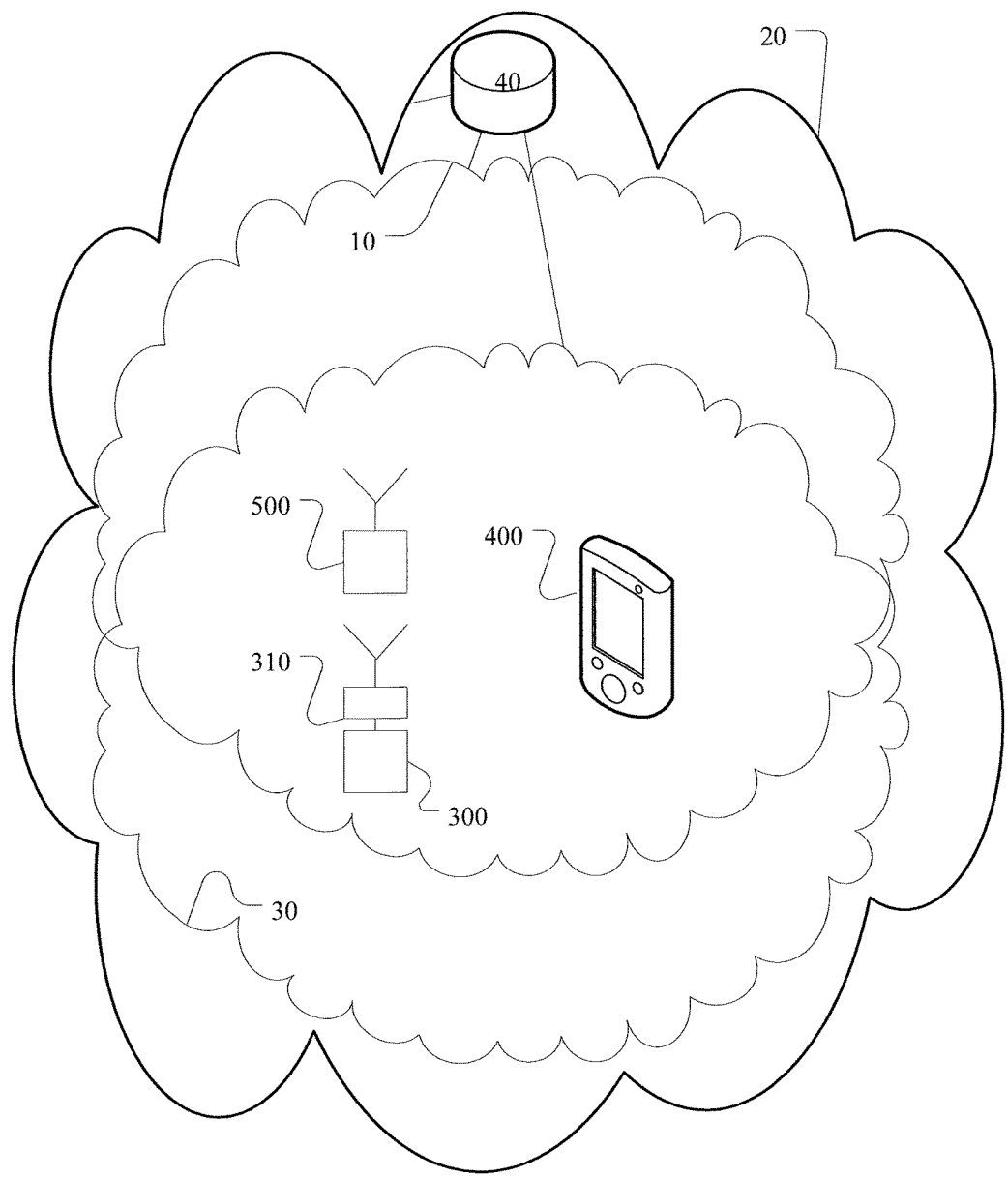
FIG. 1 illustrates a global communication system, related to the present invention, FIGS. 2a and 2b schematically illustrates the consumed bandwidth over time and the threshold to trigger an attempt to transfer the UE to LTE access network or to a legacy RAN, respectively, FIG. 3 schematically illustrates the signaling flow chart according to some embodiments of the present invention, and FIGS. 4a and 4b schematically illustrate flowcharts of method steps according to embodiments of the present invention.

A global communications network 20 will now be described in relation to FIG. 1. The global network 20 comprises a core network 40, a LTE RAN 10 and a legacy RAN 30, which may be any of a group of legacy RANs that may provide both CS and PS session communication services, including, but not limited to 3GPP GSM or WCDMA, or CDMA2000 RANs. The legacy RAN 30 comprises a controlling access node 300. The controlling access node 300 may comprise a radio interface module 310 or may be connectable thereto. The controlling access node 300 controls a cell via the radio interface module 310. The core network 40 is an Evolved Packet Core network. The LTE RAN 10 may in principle provide the UE with PS communication services of higher bandwidth than is available through the legacy RAN 30, but has no native support for CS communication services or specifically CS voice services. It may therefore rely on the legacy RAN 30 to provide CS communication services within the global network 20. The LTE RAN 10 comprises an eNodeB 500. In an exemplary embodiment of aspects of the present invention, the legacy RAN 30 may be a UTRAN, comprising a NodeB controlled by a Radio Network Controller (RNC) 300. Further, the global network 20 comprises a set of mobile user terminals, including the depicted mobile user terminal 400, which is an LTE and legacy access network capable terminal. Throughout this patent application the term User Equipment or UE may be used interchangeably to refer to such as a mobile user terminal Some UEs are not designed for voice calls and are therefore less troubled by the lack of native CS voice services in LTE. However, such UEs may still be adapted for other CS communication services. Other UE's support both data and voice services. These UEs, in particular UEs with a voice centric service profile, and further networks catering to such UEs, may benefit from preemptive UE camping on the legacy RAN 30, since it statistically reduces the mean CS call setup time in the network, and often actually reduces CS call setup in the UE. Further, the network as such may benefit from embodiments of the present invention, since the methods can be used in relation to either of the above type of UE as means for network load balancing. Still further, embodiments of the present invention may be used as a means for power management, both in an individual UE and in access network nodes. For the purpose of this patent application, the terms "connect", "disconnect" and "transfer" are intended as generic descriptions, which may be implemented with an applicable procedure, or procedures as described in the relevant 3GPP LTE and legacy network standard specifications.

Figure 2A:
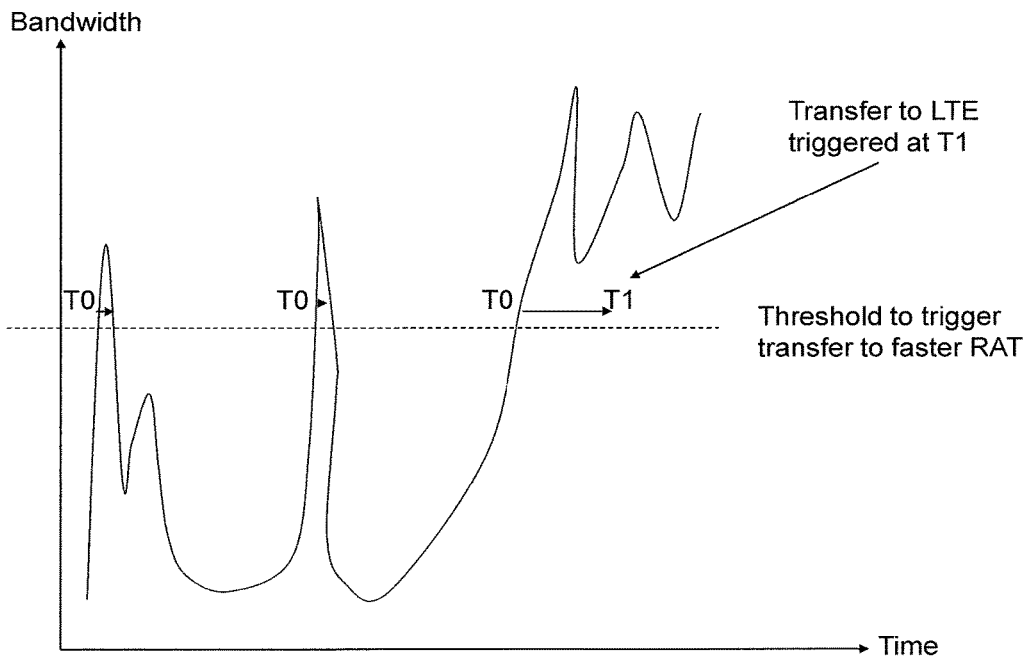
Figure 2B:
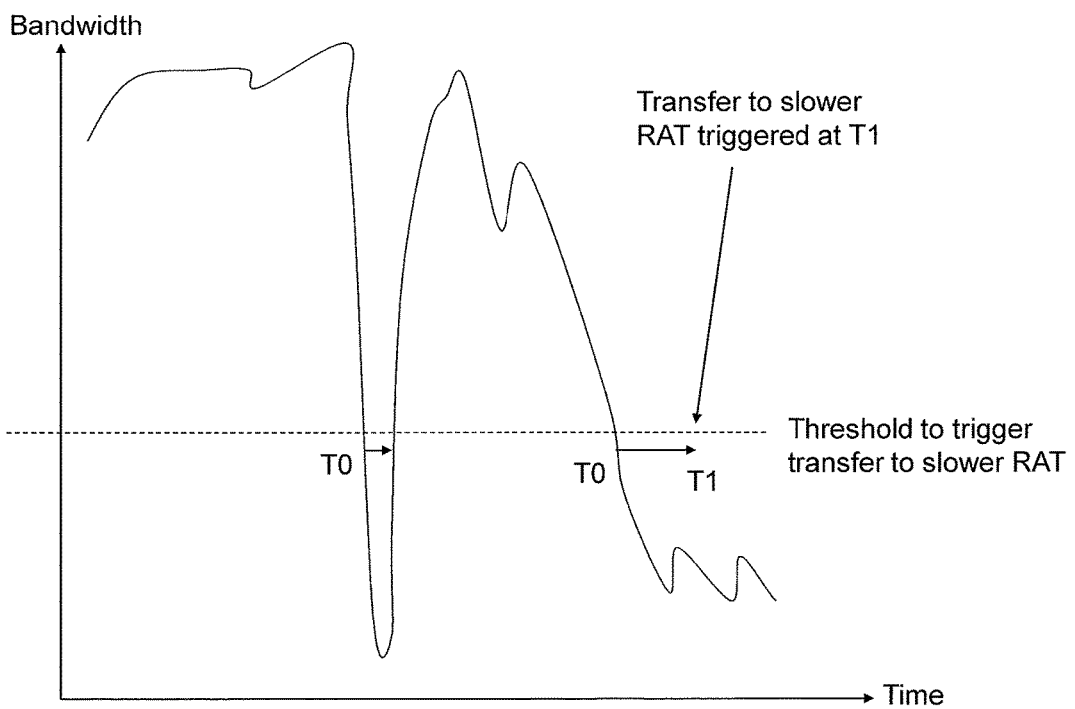

FIGS. 2a and 2b schematically illustrates the consumed bandwidth over time and the threshold to trigger an attempt to transfer the UE to LTE RAN or to a legacy RAN, respectively. In FIG. 2a the LTE capable UE is preemptive camping on one of the legacy RANs. The bandwidth consumption is monitored by measuring the bandwidth usage at certain time intervals T0 to check if the consumed bandwidth exceeds a predefined threshold, shown with a dotted line in FIG. 2a. If the current bandwidth exceeds the threshold it is an indication to trigger an attempt to transfer the UE from the current legacy RAN to the LTE RAN. In its simplest form of the present invention an attempt to transfer the UE to the LTE RAN is triggered when the threshold is exceeded. However, there are many more parameters than exceeding a bandwidth threshold that may be used to trigger the attempt to transfer the UE in order to increase the accuracy of the measurements of bandwidth usage and for example avoid sampling two peaks after each other.

Sampling two peaks after each other may for example lead to a ping-pong effect for bursty applications having an overall low bandwidth requirement. In FIG. 2a the ping-pong effect will occur if the UE is transferred from the legacy RAN to the LTE RAN after the first measurement T0, i.e. at the first short peak exceeding the bandwidth threshold. If a new measurement is made a short while thereafter, i.e. somewhere in between the first and second T0 in FIG. 2a, the consumed bandwidth has fallen below the bandwidth threshold and the UE will be transferred from the LIE RAN back to the legacy RAN. At the second T0 the bandwidth threshold will once again be exceeded and the UE transferred to the LTE RAN once again and since the consumed bandwidth shortly thereafter is below the bandwidth threshold a new transfer to the legacy RAN will occur. Thus, the ping-pong effect is created as a skilled person readily recognizes.

If also the time is used as a parameter for triggering an attempt to transfer the UE to the LTE RAN the ping-pong effect may easily avoided. In FIG. 2a the time is shown with arrows starting at T0. At the first measurement T0 in FIG. 2a the time arrow is short and will not reach the time threshold T1. Thus, even if the bandwidth usage threshold has been exceeded no attempt to trigger the transfer of the UE will be performed since the time threshold has not been fulfilled, i.e. the bandwidth threshold was exceeded during a time shorter then the time threshold T1. As can be seen in FIG. 2a the same is true for the second measurement of T0. As mentioned above there are only two short peaks at the first and second T0 measurement, i.e. the overall consumed bandwidth does not justify a transfer from the legacy RAN to the LTE RAN. However, at the third T0 measurement both the bandwidth usage threshold and the time threshold T1 have been exceeded and thus an attempt to trigger the transfer of the UE to the LTE RAN will be made. In a preferred embodiment the attempt to transfer the UE to the LTE RAN is performed only if the UE is within the coverage area of LTE RAN. In another preferred embodiment the attempt to transfer the UE to the LTE RAN is performed only if there is no ongoing CS connection.

In FIG. 2b the UE is in contrast to FIG. 2a initially camping on the LTE RAN, i.e. it is in a mode where it makes use of the high bandwidth of the LTE. The principle when to trigger the attempt to transfer the UE is the same as in FIG. 2a. However, the triggering is made when the consumed bandwidth falls below the bandwidth threshold compared to exceeding the bandwidth threshold in FIG. 2a. In a preferred embodiment of the present invention the time threshold T1 is also used in conjunction with the case in FIG.

2b, i.e. when the consumed bandwidth falls below the bandwidth threshold. It is believed, given the description above in conjunction with FIG. 2a, that this is readily understood by a person skilled in the art and is therefore not described once again.

Figure 3:
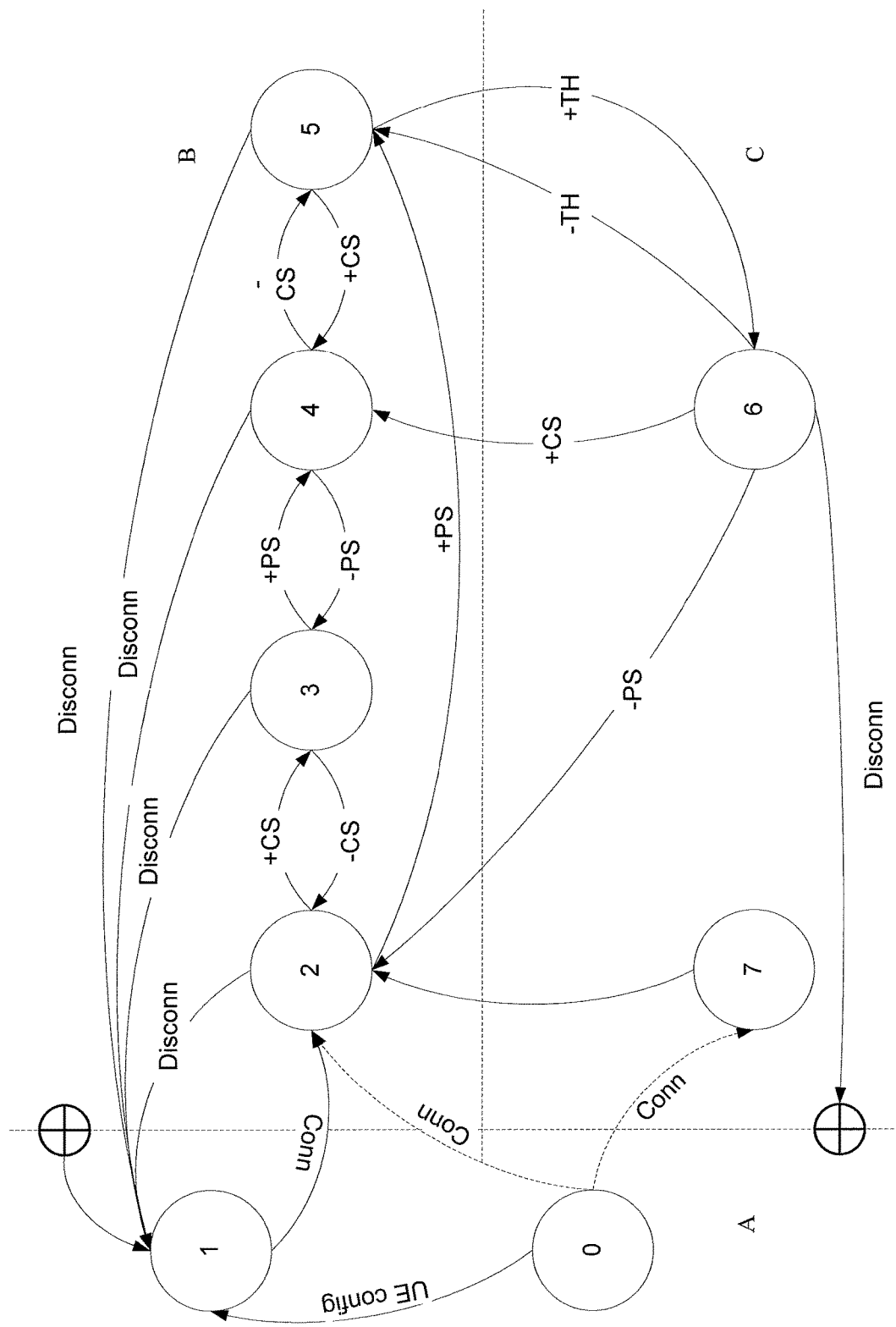

FIG. 3 is a diagram illustrating a set of states in which an LTE and CS voice capable UE may be in, and further how and why the UE may transfer between the different states as a consequence of the methods according to the present invention. The circles represent different states in which a UE according to the present invention may be in. The arrows symbolize how the terminals may move between states. Moving between states is usually contingent upon a certain event. The figure is divided into three areas by lines. The left-most area A represents the "no-RAN" dimension or more specifically a dimension where the UE is not aware of any available RAN resources. This may be because there is in fact no coverage, because the UE is still not fully powered up, or because of another situation where radio access to the mobile is disabled. The top-right area B represents the "legacy-RAN" dimension, in which the UE is aware of the legacy RAN 30, even though the legacy RAN 30 may be unaware of the UEs precise location. In analogy with this, the bottom-right area C represents the LTE-dimension.

State 0 corresponds to a brand new powerless terminal. In the event that it is powered up it may e.g. attempt to connect to a RAN. This is represented by the dotted arrows. A non-preconfigured UE may attempt to access either RAN, to the extent that they are available.

In state 1 a terminal is configured for legacy RAN preference if legacy RAN 30 is available. In state 2 the UE is connected to and camping on a legacy RAN. No PS or CS sessions are ongoing. In state 3 only a CS session is established and in state 4 both CS and PS sessions are established. In state 5 only the PS session is established, i.e. the bandwidth threshold has not yet been exceeded.

In state 6 a PS session in LTE has been established, i.e. the bandwidth threshold has been exceeded as described above. In state 7 the UE is in IDLE mode. It should be noted that state 7 is a temporary state, and that the UE will eventually be transferred by default to a legacy RAN. A UE may be transferred between the above described states based on certain events. In FIG. 3 the events are symbolized as follows:

+CS: a CS data session is being initiated.
−CS: a CS data session is being terminated.
+PS: a PS data session is being initiated.
−PS: a PS data session is being terminated.
+TH: PS data bandwidth in the UE is exceeding some predefined threshold.
−TH: PS data bandwidth in the UE is deceeding some predefined threshold.
Conn: the UE establishes some form of radio contact with the network.
Disconn: an established radio contact with the network is lost.

Figure 4A:
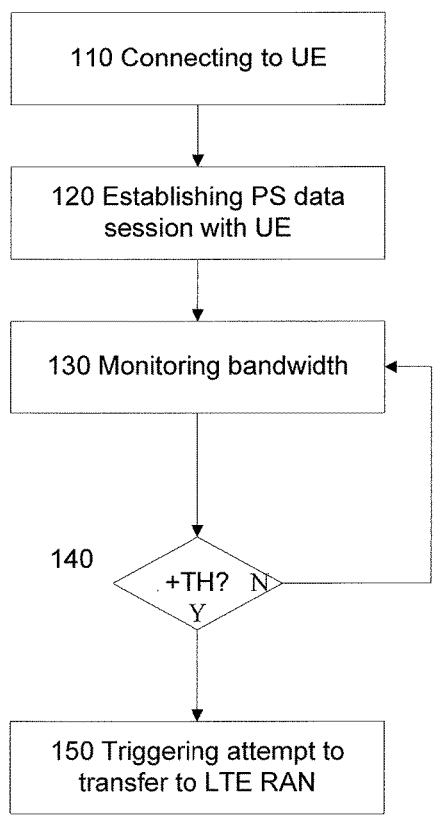

A method in a legacy access node 300 for selecting a suitable RAN according to an embodiment of the present invention will now be described in relation to FIG. 4a. The method is directed towards a LTE UE 400 that is capable of both PS and CS sessions in a global communication network 20.

In a first step the 110, the UE is connected to a legacy RAN 30 via a radio interface module 310. The legacy RAN is capable of providing both CS and PS services. If the UE 400 has been involved in some previously initiated PS data session this connecting step 110 may further comprise receiving a request for resources from an eNodeB via the core network 40.

In next step 120 the access node 300 establishes a PS data session with the connected UE 400 via the radio interface module 310. The PS data session may have been originally initiated between the UE 400 and the access node 300, or the PS data session may have been initiated in an eNodeB, and subsequently handed over to the access node 300.

Thereafter in a monitoring step 130 the access node 300 may monitor the bandwidth required by the ongoing PS data session with the UE 400. The access node 300 may measure the bandwidth or certain aspects of the bandwidth itself, or it may use measurements provided from another network node, such as the radio interface module 310, the UE 400, or a node in the core network 40. The measured bandwidth is then, in step 140, compared with a predefined bandwidth threshold. If the bandwidth exceeds some predefined first bandwidth threshold, and further if the UE 400 is not involved in a CS session, the access node 300 may, via the radio interface module 310, trigger the UE 400, in step 150, to attempt to transfer to an eNodeB in the LTE RAN. The skilled person will appreciate that a further contingency for the transferring step 140 is that there is actually available LTE coverage. Unless the access node 300 already knows that an appropriate eNodeB is available, the triggering step 150 must further comprise investigating available LTE resources.

The triggering step 150 may be contingent upon yet further criteria being fulfilled. For instance, the consumed bandwidth may have to exceed a first threshold, and then remain above the first threshold for some predefined period of time T1 before the transfer order is sent, as mentioned above in conjunction with FIG. 2a.

The legacy access node 300, via the radio interface module 310, may further send a configuration order to the UE 400 to preferably select the legacy RAN for camping. This may be performed contingent upon one or many parameters, including UE 400 capabilities and/or UE 400 subscription type. UE capabilities may be provided by a UE upon connection. UE subscription type may be provided by the core network 40.

Figure 4B:
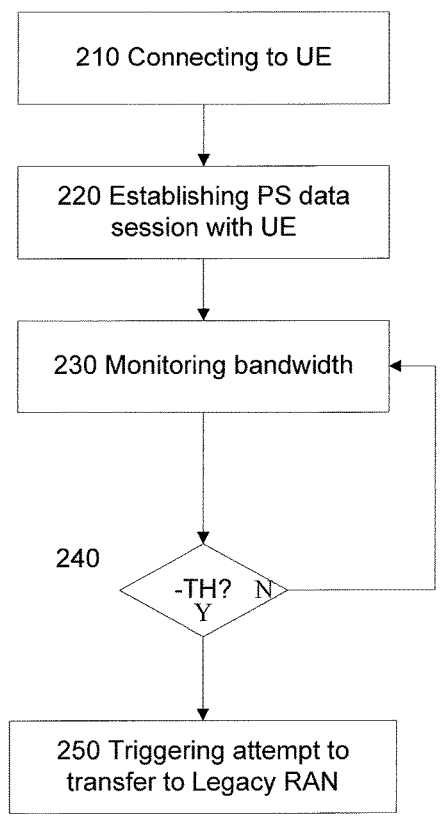

A method in a an eNodeB 500 for selecting a suitable RAN according to an embodiment of the present invention will now be described in relation to FIG. 4b. The method in the eNodeB 500 is almost the same as in the legacy access node 300, except for being performed in the eNodeB 500 instead of in the legacy access node 300. There is one more significant difference in that the triggering step is performed when the monitored bandwidth is falling below a predefined bandwidth threshold and not exceeding the same as is the case in the legacy access node 300. Thus, since both the methods are almost identical the method performed by the eNodeB 500 will only be described briefly.

In a connecting step 210 the eNodeB 500 connects with a UE 400. In an establishing step 220, the eNodeB 500 establishes the PS data session with the connected UE 400. The eNodeB 500 further monitors the ongoing traffic, and especially the consumed bandwidth, in a monitoring step 230. In a comparing step 240 the monitored bandwidth is compared to a second bandwidth threshold. As long as the bandwidth does not fall below this predefined threshold the eNodeB 500 will allow the UE 400 to remain connected. However, if the bandwidth should deceed the predefined threshold, the eNodeB 500 sends a request for resources to the access node, and triggers an attempt to transfer the UE 400 to a legacy RAN in a transferring step 250. The access node 300 receives this request for resources as described in relation to the connecting step 110 above. The transferring step 250 may be further contingent upon the threshold not only deceeding, but remaining below the second threshold for some predefined time period T1. The eNodeB will further send an order to the UE 400 to transfer back to the UTRAN if the ongoing PS session is terminated.

The eNodeB, or the network via the eNodeB node may further configure the UE 400 to preferably select a legacy node for the attach procedure. Alternatively, the UE 400 may already have been configured by a legacy access node according to a configuration step in an embodiment of the method in the access node 300.

In the event that a UE 400 with CS capabilities attempts to connect in order to initiate a PS session via the eNodeB 500, it may for practical reasons be allowed to do so for a while. A request may be granted initially, so that an initial burst of PS data may be expedited. The eNodeB then orders the UE 400 to transfer back to the legacy network at some appropriate time.

The first and second thresholds mentioned above may be identical. However, the first threshold may also be slightly above the second threshold, so as to reduce the occurrence of repeated transferring of the UE 400 back and forth between the two access networks. Further, transfers in both directions may further be contingent upon the bandwidth not only instantly exceeding or deceeding the respective threshold, but further exceeding and deceeding respective thresholds for certain duration of time. This further reduces occurrences of repeated transferring of the UE 400 between access networks as mentioned above in conjunction with FIG. 2.

In the event that the PS data session is terminated while the UE 400 is still connected to the eNodeB, or at any rate if the terminal enters idle mode, the UE 400 will be transferred back to a legacy node to camp in the UTRAN. In the event that a CS session is requested, either as a mobile originating session or a mobile terminating session, the UE 400 is further transferred to a legacy node.

Common for all aspects of the present invention is that system information directing a UE to a preferred RAN may be transmitted either via system information on a control channel, or via a dedicated message sent from the respective radio access nodes.

With further reference to FIG. 3, the triggering step 150 transfers the UE from state 5 to state 6. Equivalently, the transferring step 250 transfers the UE back from state 6 to state 5. Note, though, that this does no necessarily mean that the UE is transferred back and for the between the same legacy node and LTE node. Besides the method steps described above, the nodes involved are subject to e.g. mobility requirements and Quality of Service (QoS) requirements which may cause the UE to transfer to a new access node in every transfer.

All methods according to aspects of the present invention are contingent upon the UE corresponding to a certain profile, for which the method steps may be particularly beneficial. If implemented in relation to a UE 400 with CS voice capabilities, the methods according to aspects of the claimed invention causes a statistical reduced CS call setup in the UE 400. As long voice call setup times are negative from a user perspective this is a great advantage. Even if the UE is not specifically voice capable, it may still benefit from the proposed methods for other CS communication services. Further, the proposed methods may be used as a network tool for load balancing. In that aspect the methods are advantageous also when implemented in relation to a UE with PS communication capabilities only. The proposed methods may further be advantageous from a network power management perspective and from a UE power management perspective when implemented in relation to various UE profiles. The subscriber having a multi-RAT capable LTE UE can experience a fast voice call setup, and then support a spectrum of emergency services in the legacy RAN. Whenever very high data rates are required the UE is transferred to LTE.

Furthermore the operator will get a tool for bandwidth usage differentiated subscriptions. It is from an end-user perspective more acceptable to have a short interruption in data at the beginning of an IP session than having a slow voice setup when performing a call. The bandwidth usage as a trigger for inter-RAT mobility, i.e. mobility between different RANs, can also be applied in order to even out load distribution between RANs during busy hours.

The invention claimed is:

1. A method in a legacy access node for selecting a suitable radio access network, RAN, of a plurality of RANs for a long term evolution, LTE, user equipment, UE, capable of both packet switched, PS, and circuit switched, CS, sessions in a global communication network, the method comprising:
   connecting the LTE-UE, via a radio interface module, to a legacy RAN capable of providing both PS and CS services,
   establishing a PS session in the legacy RAN between the legacy access node and the connected LTE-UE,
   monitoring, by the legacy access node, a PS data bandwidth usage of the PS session between the legacy access node and the LTE-UE that the LTE-UE is consuming,
   comparing, by the legacy access node, the PS data bandwidth usage of the PS session between the legacy access node and the LTE-UE that the LTE-UE is consuming with a bandwidth threshold, and
   triggering, by the legacy access node, an attempt of transferring the PS session with the connected LTE-UE from the PS session in the legacy RAN to a PS session in an LTE RAN based on the PS data bandwidth usage of the PS session between the legacy access node and the LTE-UE that the LTE-UE is consuming exceeding the bandwidth threshold,
   wherein the comparing comprises determining, by the legacy access node, whether the PS data bandwidth usage that the LTE-UE is consuming exceeds the bandwidth threshold and continues to remain above the bandwidth threshold during a period of time, and
   wherein the triggering is performed by the legacy access node only responsive to when the PS data bandwidth usage that the LTE-UE is consuming is determined to exceed the bandwidth threshold and determined to continue to remain above the bandwidth threshold during the period of time.

2. The method according to claim 1, further comprising determining, by the legacy access node, whether the LTE-UE is within a coverage area of the LTE RAN, wherein the triggering is performed by the legacy access node only responsive to when the LTE-UE is determined to be within the coverage area of the LTE RAN.

3. The method according to claim 1, further comprising determining, by the legacy access node, whether the LTE-UE is not involved in a CS session, wherein the triggering is performed by the legacy access node only responsive to when the LTE-UE is determined to not be involved in a CS session.

4. The method according to claim 1, wherein the connecting comprises providing, by the legacy access node, the LTE-UE with a priority list directing the LTE-UE to prefer the legacy RAN over the LTE RAN for connection.

5. The method according to claim 1, wherein the connecting comprises receiving, by the legacy access node, UE capabilities information and/or UE subscription type information from the connecting LTE-UE via the radio interface module, and wherein the triggering is further based on the UE capabilities information and/or UE subscription type information.

6. A method in an eNodeB for selecting a suitable radio access network, RAN, of a plurality of RANs for a long term evolution, LTE, user equipment, UE, capable of both packet switched, PS, and circuit switched, CS, sessions in a global communication network, the method comprising:
connecting the LTE-UE to an LTE RAN,
establishing a PS session in the LTE RAN between the eNodeB and the connected LTE-UE,
monitoring, by the eNodeB, a PS data bandwidth usage of the PS session between the eNodeB and the LTE-UE that the LTE-UE is consuming,
comparing, by the eNodeB, the PS data bandwidth usage of the PS session between the eNodeB and the LTE-UE that the LTE-UE is consuming with a bandwidth threshold, and
triggering, by the eNodeB, an attempt of transferring the PS session with the connected LTE-UE from the PS session in the LTE RAN to a PS session in a legacy RAN based on the PS data bandwidth usage of the PS session between the eNodeB and the LTE-UE that the LTE-UE is consuming falling below the bandwidth threshold,
wherein the comparing comprises determining, by the eNodeB, whether the PS data bandwidth usage that the LTE-UE is consuming falls below the bandwidth threshold and continues to remain below the bandwidth threshold during a period of time, and
wherein the triggering is performed by the eNodeB only responsive to when the PS data bandwidth usage that the LTE-UE is consuming is determined to fall below the bandwidth threshold and determined to continue to remain below the bandwidth threshold during the period of time.

7. The method according to claim 6, wherein the connecting comprises receiving, by the eNodeB, UE capabilities information and/or UE subscription type information from the connecting LTE-UE when the LTE-UE is connecting to the LTE RAN for the first time, and wherein the triggering is further based on the UE capabilities information and/or UE subscription type information.

8. The method according to claim 6, wherein the connecting comprises sending, by the eNodeB, a priority list to the LTE-UE, thereby instructing the LTE-UE to prefer the legacy RAN over the LTE RAN for reconnection in the event of a temporary loss of connection.

9. A legacy access node for selecting a suitable radio access network, RAN, of a plurality of RANs for a long term evolution, LTE, user equipment, UE, capable of both packet switched, PS, and circuit switched, CS, sessions in a global communication network, said legacy access node being configured to perform operations comprising:
connecting the LTE-UE, via a radio interface module, to a legacy RAN capable of providing both PS and CS services,
establishing a PS session in the legacy RAN between the legacy access node and the connected LTE-UE,
monitoring, by the legacy access node, a PS data bandwidth usage of the PS session between the legacy access node and the LTE-UE that the LTE-UE is consuming,
comparing, by the legacy access node, the PS data bandwidth usage of the PS session between the legacy access node and the LTE-UE that the LTE-UE is consuming with a bandwidth threshold, and
triggering, by the legacy access node, an attempt of transferring the PS session with the connected LTE-UE from the PS session in the legacy RAN to a PS session in an LTE RAN based on the PS data bandwidth usage of the PS session between the legacy access node and the LTE-UE that the LTE-UE is consuming exceeding the bandwidth threshold,
wherein the operations further comprise determining, by the legacy access node, whether the PS data bandwidth usage that the LTE-UE is consuming exceeds the bandwidth threshold and continues to remain above the bandwidth threshold during a period of time, and
wherein the legacy access node is configured to perform the triggering only responsive to when the PS data bandwidth usage that the LTE-UE is consuming is determined to exceed the bandwidth threshold and determined to continue to remain above the bandwidth threshold during the period of time.

10. The legacy access node according to claim 9, wherein the operations further comprise determining, by the legacy access node, whether the LTE-UE is within a coverage area of the LTE RAN, and wherein the legacy access node is configured to perform the triggering only responsive to when the LTE-UE is determined to be within the coverage area of the LTE RAN.

11. The legacy access node according to claim 9, wherein the operations further comprise determining, by the legacy access node, whether the LTE-UE is not involved in a CS session, and wherein the legacy access node is configured to perform the triggering step only responsive to when the LTE-UE is determined to not be involved in a CS session.

12. The legacy access node according to claim 9, wherein the connecting comprises providing, by the legacy access node, the LTE-UE with a priority list directing the LTE-UE to prefer the legacy RAN over the LTE RAN for connection.

13. The legacy access node according to claim 9, wherein the connecting comprises receiving, by the legacy access node, UE capabilities information and/or UE subscription type information from the connecting LTE-UE via the radio interface module, and wherein the triggering is further based on the UE capabilities information and/or UE subscription type information.

14. An LTE eNodeB for selecting a suitable radio access network, RAN, of a plurality of RANs for a long term evolution, LTE, user equipment, UE, capable of both packet switched, PS, and circuit switched, CS, sessions in a global communication network, said LTE eNodeB being configured to perform operations comprising:
connecting the LTE-UE to an LTE access network,
establishing a PS session in the LTE RAN between the eNodeB and the connected LTE-UE,
monitoring, by the eNodeB, a PS data bandwidth usage of the PS session between the eNodeB and the LTE-UE that the LTE-UE is consuming,
comparing, by the eNodeB, the PS data bandwidth usage of the PS session between the eNodeB and the LTE-UE that the LTE-UE is consuming with a bandwidth threshold, and triggering, by the eNodeB, an attempt of transferring the PS session with the connected LTE-UE from the LTE RAN to a legacy RAN based on the PS data bandwidth usage of the PS session between the eNodeB and the LTE-UE that the LTE-UE is consuming falling below the bandwidth threshold, wherein the operations further comprise determining, by the eNodeB, whether the PS data bandwidth usage that the LTE-UE is consuming falls below the bandwidth threshold and continues to remain below the bandwidth threshold during a period of time, and wherein the eNodeB is configured to perform the triggering only responsive to when the PS data bandwidth usage that the LTE-UE is consuming is determined to fall below the bandwidth threshold and determined to continue to remain below the bandwidth threshold during the period of time.

15. The eNodeB according to claim 14, wherein the connecting comprises receiving, by the eNodeB, UE capabilities information and/or UE subscription type information from the connecting LTE-UE when the LTE-UE is connecting to the LTE RAN for the first time, and wherein the triggering is further based on the UE capabilities information and/or UE subscription type information.

16. The eNodeB according to claim 14, wherein the connecting comprises sending, by the eNodeB, a priority list to the LTE-UE, thereby instructing the LTE-UE to prefer the legacy RAN over the LTE RAN for reconnection in the event of a temporary loss of connection.

* * * * *